United States Patent [19]

Chen

[11] Patent Number: 4,993,735
[45] Date of Patent: Feb. 19, 1991

[54] FRAME FORK FOR A BICYCLE

[76] Inventor: Ruo Chen, No. 34, Chia Hou Rd., Wai Pu Hsiang, Taichung Hsien, Taiwan

[21] Appl. No.: 468,899

[22] Filed: Jan. 23, 1990

[51] Int. Cl.⁵ ............................................ B62K 21/04
[52] U.S. Cl. ..................................... 280/280; 280/279; 280/281.1; 29/521; 29/525; 74/551.1; 74/551.8; 403/282; 403/285
[58] Field of Search ............ 280/279, 280, 276, 281.1, 280/288, 270; 403/282, 285, 377, 205, 217; 29/521, 525; 74/551.8, 551.1

[56] References Cited

U.S. PATENT DOCUMENTS

| | | |
|---|---|---|
| 482,090 | 9/1892 | Kehr ................... 280/280 |
| 589,147 | 8/1897 | Sturges ............... 280/280 |
| 609,937 | 8/1898 | Kelly .................. 280/280 |
| 4,113,395 | 9/1978 | Pawsat et al. ....... 280/279 |
| 4,819,969 | 4/1989 | Williams ............. 29/525 |
| 4,887,828 | 12/1989 | Chonan .............. 280/279 |

FOREIGN PATENT DOCUMENTS

| | | |
|---|---|---|
| 0013009 | 10/1896 | Switzerland ............ 280/281.1 |
| 0021151 | of 1896 | United Kingdom ...... 280/281.1 |
| 0454586 | 10/1936 | United Kingdom ...... 280/281.1 |

Primary Examiner—Richard A. Bertsch
Assistant Examiner—A. M. Boehler
Attorney, Agent, or Firm—Renner, Otto, Boisselle & Sklar

[57] ABSTRACT

A frame fork for a bicycle includes a main tube, two support tubes, a fork head including a bracing tube and two legs integrally formed together, and a sleeve including a sleeve body and two limbs integrally formed together. A center hole is formed in the sleeve body. The bracing tube passes through the center hole of the sleeve body and the lower end of the main tube. The sleeve body embraces the lower end of the main tube. Each leg of the fork head and a respective limb of the sleeve are force fitted into each upper end of the support tube.

7 Claims, 3 Drawing Sheets

FRAME FORK FOR A BICYCLE

BACKGROUND OF THE INVENTION

The present invention relates to a frame fork, and more particularly to a frame fork for a bicycle.

A conventional frame fork is shown in FIG. 4. The frame fork comprises a main tube M, a coupling element C being provided at a bottom end of the main tube M and being straddled over a lateral tube L and two support tubes S fixed to the ends of the lateral tube L. A connection either between the coupling element C and the lateral tube L or between the lateral tube L and the support tubes S is generally a welded connection where most failures occur. The welding process is time consuming. In addition, it is difficult to maintain the quality of welded products.

The present invention has arisen to mitigate and/or obviate the afore-described disadvantages of the conventional frame fork.

SUMMARY OF THE INVENTION

The primary objective of the present invention is to provide a frame fork for a bicycle which is formed without a weld.

In accordance with one aspect of the invention, there is provided a frame fork for a bicycle which includes a main tube, an annular flange being formed on a bottom of the open lower end, two support tubes, a fork head including a bracing tube and two legs integrally formed together, and a sleeve including a sleeve body and two limbs integrally formed together. A center hole is formed in the sleeve body. The bracing tube passes through the center hole of the sleeve body and an open lower end of the main tube. The sleeve body embraces the lower end of the main tube. Each leg of the fork head and a respective limb of the sleeve are force fitted into each upper end of the support tube.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
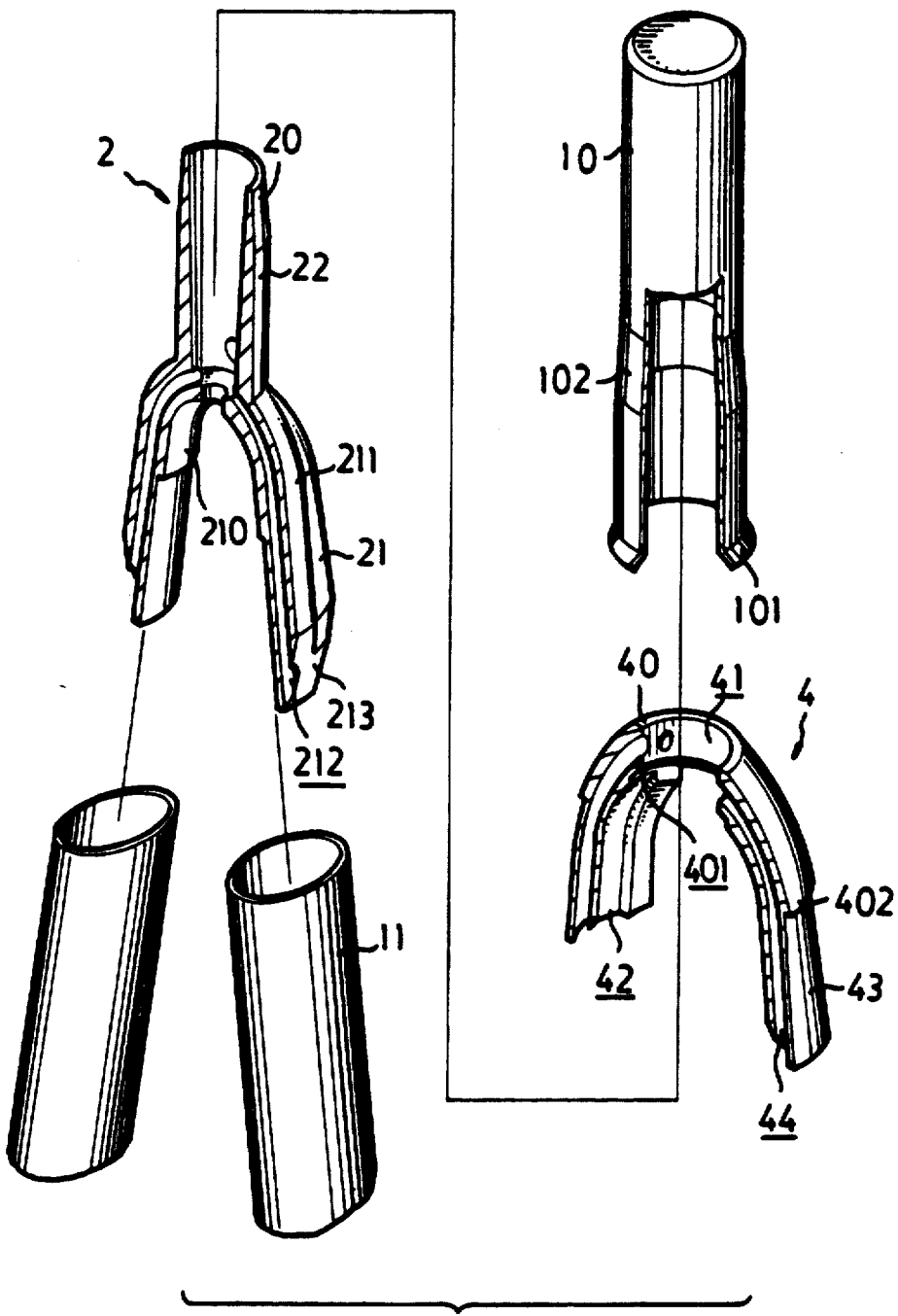
FIG. 1 is an exploded view of a frame fork in accordance with the present invention.
Figures 2, 3:
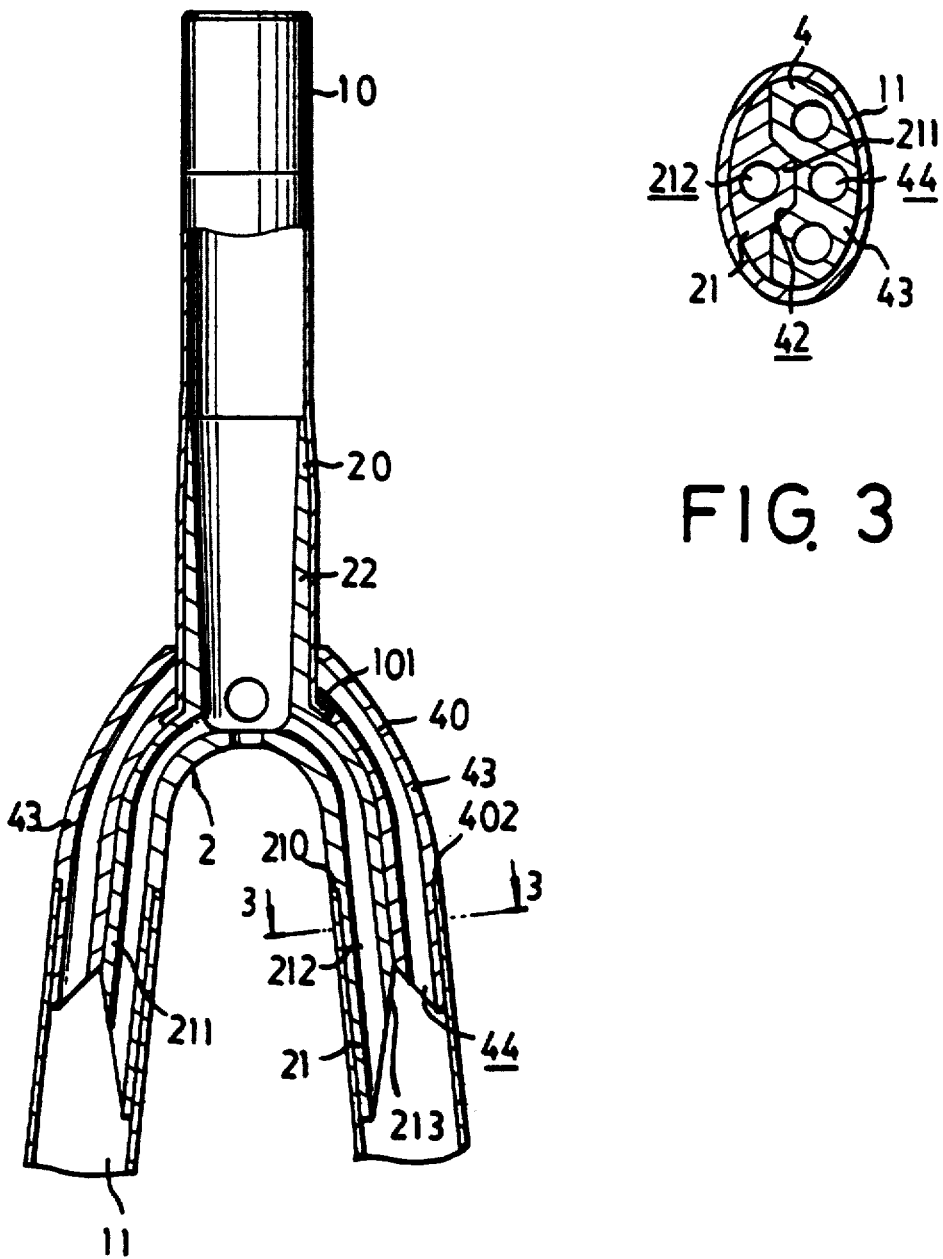
FIG. 2 is a partial cross sectional view of the frame fork.
FIG. 3 is a cross sectional view of the frame fork taken along lines 3—3 in FIG. 2.
Figure 4:
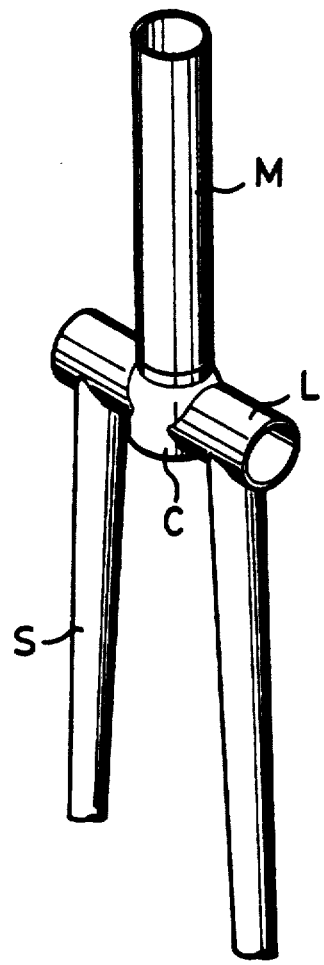
FIG. 4 is a perspective view of a conventional frame fork for a bicycle.

Referring to the drawings and initially to FIGS. 1 and 2, a frame fork for a bicycle in accordance with the present invention comprises generally a main tube 10, two support tubes 11, a fork head 2 and a sleeve 4.

The main tube 10 is substantially cylindrical with an open lower end. An annular flange 101 is formed at the lower end of the main tube 10. A tapered intermediate portion 102 is formed on the main tube 10. Each support tube 11 has a substantially elliptical cross section. The fork head 2 includes a pair of legs 21 and a bracing tube 22 which are integrally formed. A tapered end 20 is formed on an outer and upper peripheral surface of the bracing tube 22. A rib 211 is formed longitudinally along an outer surface of each leg 21 of the fork head 2. A hole 212 is longitudinally formed in each leg 21 of the fork head 2. An inner shoulder 210 is formed on an inner and upper surface of each leg 21. A tapered end 213 is formed at an outer and lower end of each leg 21.

The sleeve 4 includes a pair of limbs 43 and a sleeve body 40 integrally formed together. A center hole 41 is formed on the sleeve body 40 for receiving the main tube 10. An annular recess 401 is formed in the bottom end of the center hole 41 for receiving the annular flange 101 of the main tube 10. An annular shoulder 402 is formed on the lower peripheral surface of the sleeve body 40. A groove 42 is longitudinally formed along an inner surface of each limb 43 for receiving and making an engagement with a respective rib 211 of the leg 21. Three holes 44 are distributed and longitudinally formed in each limb 43. The holes 212 of the legs 21 and the holes 44 of the limbs 43 are substantially provided for weight reducing purposes.

Referring next to FIGS. 2 and 3, the tapered end 20 of the bracing tube 22 passes through the center hole 41 of the sleeve body 40 and the open lower end of the main tube 10 to engage with the tapered intermediate portion 102 of the main tube 10. The sleeve body 40 embraces the lower end of the main tube 10. The lower ends of each leg 21 and a respective limb 43 form an elliptical outer surface corresponding to that of the support tube 11 and are such that the lower ends of each leg 21 and a respective limb 43 are force fitted within a respective support tube 11. The inner shoulders 210 of the legs 21 and the annular shoulder 402 of the sleeve body 40 engage with the upper surfaces of the support tubes 11. The rib 211 engages with the groove 42 so as to limit a relatively lateral movement between the leg 21 and the limb 43. An upper surface of the annular flange 101 of the main tube 10 is engaged with the annular recess 401 and a lower surface of the annular flange 101 contacts and grips an upper surface of each leg 21 so that the main tube 10 is stably held between the fork head 2 and the sleeve 4.

Accordingly, an advantage of the present invention is that the main tube 10 and the support tubes 11 are coupled together without a weld.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A frame fork for a bicycle comprising a main tube having an open lower end, an annular flange being formed on a bottom of said open lower end; two support tubes, each having an open upper end; a fork head including a bracing tube and two legs integrally formed together; a sleeve including a sleeve body and two limbs integrally formed together; a center hole being formed in said sleeve body; said bracing tube passing through said center hole of said sleeve body and said open lower end of said main tube; said sleeve body embracing said lower end of said main tube; and each said leg of said fork head and a respective limb of said sleeve being force fitted into each open upper end of said support tube.

2. A frame fork according to claim 1, wherein a tapered intermediate portion is formed on said main tube;

a tapered end is formed on an upper and outer surface of said bracing tube; and said tapered end contacts and engages with an inner surface of said tapered intermediate portion.

3. A frame fork according to claim 1, wherein an annular recess is formed in a bottom end of said center hole of said sleeve; and said annular flange is engaged within said annular recess.

4. A frame fork according to claim 1, wherein a rib is longitudinally formed along an outer surface of each said leg; a groove is longitudinally formed along an inner surface of each said limb; and each said rib is engaged within a respective groove so as to limit a relatively lateral movement between each said leg and a respective limb.

5. A frame fork according to claim 1, wherein an inner shoulder is formed on an upper and inner surface of each said leg, said inner shoulder is engaged with an inner and upper surface of each said support tube when each said leg is engaged within said support tube.

6. A frame fork according to claim 1, wherein an outer shoulder is formed on an outer and lower end of said sleeve body, said outer shoulder is engaged with an outer and upper surface of each said support tube when each said limb is engaged within said support tube.

7. A frame fork according to claim 1, wherein a first hole is longitudinally formed in each said leg, and a plurality of second holes are longitudinally formed in each said limb for reducing a weight thereof.

* * * * *